US012464108B1

(12) United States Patent
Savolainen et al.

(10) Patent No.: US 12,464,108 B1
(45) Date of Patent: Nov. 4, 2025

(54) DISPLAY HAVING CONTROLLABLE LASER LIGHT SOURCES AND CONTROLLABLE LIGHT GUIDE

(71) Applicant: Distance Technologies Oy, Helsinki (FI)

(72) Inventors: Petri Savolainen, Espoo (FI); Urho Konttori, Helsinki (FI); Mikko Strandborg, Hangonkylä (FI); Mikko Juhola, Muurla (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/045,027

(22) Filed: Feb. 4, 2025

(51) Int. Cl.
*H04N 13/344* (2018.01)
*G02B 27/01* (2006.01)
*H04N 13/324* (2018.01)
*H04N 13/383* (2018.01)

(52) U.S. Cl.
CPC ....... *H04N 13/344* (2018.05); *G02B 27/0101* (2013.01); *H04N 13/324* (2018.05); *H04N 13/383* (2018.05); *G02B 2027/0112* (2013.01); *G02B 2027/013* (2013.01); *G02B 2027/0187* (2013.01); *G02B 2207/101* (2013.01)

(58) Field of Classification Search
CPC ........ G02B 27/0093; G02B 2027/0123; G02B 2027/0178; G02B 27/0081; G02B 27/0101; G02B 27/0172; G02B 30/25; G02B 2027/0114

USPC .......................................................... 348/51
See application file for complete search history.

(56) References Cited

U.S. PATENT DOCUMENTS

| | | | |
|---|---|---|---|
| 11,604,356 B1* | 3/2023 | Holmes | G02B 27/0093 |
| 2013/0329301 A1* | 12/2013 | Travis | G02B 6/34 |
| | | | 359/630 |
| 2019/0072767 A1* | 3/2019 | Vallius | H04N 9/646 |
| 2021/0278664 A1* | 9/2021 | Tanaka | G02B 27/0101 |
| 2022/0284544 A1* | 9/2022 | Holzer | G06T 3/4038 |
| 2023/0045982 A1* | 2/2023 | Lapstun | G02B 27/0093 |
| 2025/0013069 A1* | 1/2025 | Ota | G02B 30/31 |

FOREIGN PATENT DOCUMENTS

CN 105223641 A * 1/2016 .......... G02F 1/1336

* cited by examiner

*Primary Examiner* — Masum Billah
(74) *Attorney, Agent, or Firm* — ZIEGLER IP LAW GROUP, LLC.

(57) ABSTRACT

A display device includes laser light sources of different colours and at least one light guide. The at least one light guide includes a light outlet including a plurality of exit portions, and is controllable to sequentially guide light rays emitted by the laser light sources towards different exit portions of the light outlet. A pixel of an image is displayed by: (i) determining a corresponding exit portion, based on a pixel location of the pixel in the image; (ii) controlling the laser light sources to emit light rays having a colour and an intensity representative of the pixel, based on intensity values of different colour components of the pixel; and (iii) controlling the at least one light guide to guide said light rays towards the corresponding exit portion from which the light rays exit.

20 Claims, 6 Drawing Sheets

DISPLAY HAVING CONTROLLABLE LASER LIGHT SOURCES AND CONTROLLABLE LIGHT GUIDE

TECHNICAL FIELD

The present disclosure relates to display devices having controllable laser light sources and controllable light guides. The present disclosure also relates to systems for displaying images, employing such display devices. The present disclosure further relates to methods for displaying images, employing such display devices.

BACKGROUND

Heads-up displays (HUDs) that project images on vehicle windshields or other windows need to work in various lighting conditions, for example, ranging from direct sunlight to dimly-lit night conditions. An especially challenging situation is when an outdoor lighting condition is very bright (for example, when an average intensity of ambient light lies in a range of 10000 lux to 25000 lux). In such challenging situations, a conventional liquid crystal display (LCD) based HUD may not be capable of achieving brightness levels that can produce a legible image. This problem is exacerbated when an area on which images are projected is relatively large (for example, when a field of view of said area lies in a range of 20 degrees×20 degrees to 60 degrees×25 degrees, or even more). This is because in such situations, a limited number of photo-emitting cells in the LCD based HUD are utilised to display the images on a relatively larger area, which means that light produced by a single pixel has to cover a relatively larger pixel area, thereby reducing an overall brightness of the displayed images.

To add to this, in case of 3D HUDs, where a light field display unit comprises a multiscopic optical element (for example, such as a parallax barrier, a lenticular array, an array of liquid crystal lenses, or similar) for producing an autostereoscopic effect, the overall brightness of displayed images is further reduced. This overall brightness is even further reduced in cases where there are multiple users. Combined with the challenges of a conventional LCD based HUD, such multiscopic optical elements may not allow to achieve sufficient brightness levels that can produce legible images. This may be even more problematic when a dark visual scene is required to be presented.

It is well known that low brightness levels can make it difficult for users to discern visual details and perceive colours in the displayed images.

This can lead to eyestrain and reduced usability, as users may struggle to perceive a 3D visual scene.

Therefore, in light of the foregoing discussion, there exists a need to overcome the aforementioned problems.

SUMMARY

The present disclosure seeks to provide a display device, a system and a method for facilitating high-quality autostereoscopy and multiscopy, even in bright outdoor lighting conditions and even with a relatively wide field of view (for example, in a range of 20 degrees×20 degrees to 60 degrees× 25 degrees, or more). The aim of the present disclosure is achieved by a display device in which a plurality of laser light sources are controlled to emit high-intensity light rays having colour and intensity of a given pixel at a given time instant, while at least one light guide is controlled to guide the high-intensity light rays towards a corresponding exit portion of a light outlet, from which these high-intensity light rays exit, as well as a system and a method for displaying images, by employing such a display device, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 1A and 1B are simplified exploded views of a display device, while

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a display device comprising:
- a plurality of laser light sources of at least two different colours;
- at least one light guide comprising a light inlet and a light outlet, the light outlet comprising a plurality of exit portions, wherein the light inlet is arranged to receive light rays emitted by the plurality of laser light sources, and wherein the at least one light guide is controllable to sequentially guide the light rays towards different exit portions of the light outlet; and
- a processor configured to:
    - obtain an image to be displayed via the display device; and
    - display the image via the display device for producing a synthetic light field, wherein when displaying the image, the processor is configured to display a given pixel of the image by:

(i) determining a given exit portion of the light outlet corresponding to the given pixel, based on a pixel location of the given pixel in the image;
(ii) controlling the plurality of laser light sources to emit light rays having a colour and an intensity representative of the given pixel, based on intensity values of different colour components of the given pixel in the image; and
(iii) controlling the at least one light guide to guide said light rays towards the given exit portion from which the light rays exit.

In a second aspect, an embodiment of the present disclosure provides a method comprising:
obtaining an image to be displayed via a display device, the display device comprising a plurality of laser light sources of at least two different colours and at least one light guide comprising a light inlet and a light outlet, the light outlet comprising a plurality of exit portions, the light inlet being arranged to receive light rays emitted by the plurality of laser light sources, wherein the at least one light guide is controllable to sequentially guide the light rays towards different exit portions of the light outlet; and
displaying the image via the display device for producing a synthetic light field, wherein the step of displaying the image comprises displaying a given pixel of the image by:
(i) determining a given exit portion of the light outlet corresponding to the given pixel, based on a pixel location of the given pixel in the image;
(ii) controlling the plurality of laser light sources to emit light rays having a colour and an intensity representative of the given pixel, based on intensity values of different colour components of the given pixel in the image; and
(iii) controlling the at least one light guide to guide said light rays towards the given exit portion from which the light rays exit.

The present disclosure provides the aforementioned display device and the aforementioned method that are capable of producing high brightness suitable for autostereoscopic and multiscopic display purposes. Such high brightness is achieved by a synergistic combination of the plurality of laser light sources and the at least one light guide. Notably, the plurality of laser light sources are employed to emit light rays having the colour and the intensity representative of a single pixel at a given time instant, while the at least one light guide is employed to guide these light rays towards a corresponding exit portion of the light outlet, from which the light rays exit. The aforesaid steps (i) to (iii) are repeated for individual ones of a plurality of pixels in the image. In other words, an entirety of a light output of the plurality of laser light sources is employed to light up a single pixel at a given time instant. As a result, each pixel, when lighted up at a corresponding time instant, contributes towards producing a highly-bright synthetic light field. This allows for presenting virtual content legibly, even in bright outdoor lighting conditions (for example, when the average intensity of ambient light lies in a range of 10000 lux to 25000 lux) and even with a relatively wide field of view (for example, in a range of 20 degrees×20 degrees to 60 degrees×25 degrees, or even more).

Pursuant to the present disclosure, the aforementioned display device is suitable to be implemented in a heads-up display (HUD). However, it will be appreciated that the aforementioned display device is not limited to be implemented in an HUD only, and can also be implemented for other types of displays. Examples of the other types of displays include, but are not limited to, infotainment displays (for example, such as dashboard or rear-seat screens in vehicles for entertainment, navigation, or system control), instrument clusters (for example, such as digital or hybrid instrument panels showing speed, fuel levels, and other vehicle metrics), augmented-reality (AR) glasses, extended-reality (XR) headsets, smartphone displays, interactive kiosks, digital signage, medical imaging displays, and wearable devices (for example, such as displays on smartwatches, fitness trackers, or other personal devices).

In a third aspect, an embodiment of the present disclosure provides a system comprising:
a display device according to the aforementioned first aspect;
an optical combiner arranged on an optical path of the display device and on an optical path of a real-world light field of a real-world environment; and
at least one processor configured to:
generate or retrieve an image to be displayed via the display device; and
send the image to be displayed to the display device, wherein the display device is employed to display the image for producing a synthetic light field, and wherein the optical combiner is employed to reflect the synthetic light field towards eyes of at least one user, whilst optically combining the real-world light field with the synthetic light field.

The present disclosure also provides the aforementioned system employing the aforementioned display device. This makes the system suitable to be implemented as an HUD. In this regard, the system may be implemented as a two-dimensional (2D) HUD or a three-dimensional (3D) HUD. The system is capable of producing a highly-bright synthetic light field, due to the synergistic combination of the plurality of laser light sources and the at least one light guide of the aforementioned display device, as explained above. This allows for presenting virtual content legibly, even in bright outdoor lighting conditions (for example, when the average intensity of ambient light lies in a range of 10000 lux to 25000 lux) and even with a relatively wide field of view (for example, in a range of 20 degrees×20 degrees to 60 degrees×25 degrees, or even more). As a result, it minimises eyestrain and enhances the system's usability, allowing users to effortlessly perceive 3D visual scenes displayed by the system.

For illustration purposes, there will now be described how various components of the aforementioned display device can be implemented.

The processor controls an overall operation of the display device. The processor is communicably coupled to the plurality of laser light sources and the at least one light guide. The processor can be implemented as any one of: a microprocessor, a controller, a microcontroller. As an example, the processor can be implemented as a reduced instruction set computer (RISC) microprocessor, an application-specific integrated circuit (ASIC) microprocessor, or similar.

It will be appreciated that the plurality of laser light sources can be implemented in various ways that are well-known in the art. For brevity, some of the various ways will now be described only briefly, without limiting the plurality of laser light sources to such implementations only. The plurality of laser light sources can be implemented as lasers of the at least two different colours. In a first example implementation, the plurality of laser light sources can be implemented as a combination of lasers of primary colours, to produce the light rays having any specific colour through additive mixing of the primary colours. As an example, separate lasers of red, green and blue wavelengths (for example, such as 640 nm, 532 nm, and 445 nm, or similar) can be employed. Light rays emitted by these separate lasers can be mixed using dichroic mirrors or an optical waveguide. A technical benefit of such an implementation is that brightness and colour balance of a light output can be controlled electronically, thereby allowing for colour purity and tunability for sharp and vivid images. Such an implementation also allows for a compact and lightweight design, which is achievable with miniaturized components. Moreover, the separate lasers can be implemented to interface with the at least one light guide directly, namely without a need for any other optical element. This allows for a simple, yet robust implementation of the display device.

In a second example implementation, the plurality of laser light sources can be implemented as lasers of a red colour and a green colour. As an example, separate lasers of red and green wavelengths (for example, such as 640 nm and 532 nm, or similar) can be employed. The lasers of the red colour and the green colour provide excellent contrast and visibility even in high ambient light, making them ideal for HUDs. Such an implementation may be particularly beneficial for HUD applications in military or aviation vehicles, where it is desired to mark safe zones and danger zones using different colours for improving situational awareness of military or aviation personnels. A technical benefit of such an implementation is that it allows for a compact and lightweight design, which is achievable with miniaturized components. Moreover, the separate lasers can be implemented to interface with the at least one light guide directly, namely without a need for any other optical element. This allows for a simple, yet robust implementation of the display device. Furthermore, such an implementation is capable of producing high brightness suitable for daylight visibility, whilst also providing a long operational life and robustness against vibrations and temperature fluctuations. In this regard, the plurality of laser light sources can be implemented as solid-state lasers that have fewer moving parts and are less sensitive to environmental variations than other light sources.

As mentioned earlier, the plurality of laser light sources are controlled to emit light rays having the colour and the intensity representative of the given pixel, based on the intensity values of the different colour components of the given pixel in the image. In this regard, individual ones of the plurality of laser light sources can be controlled to emit the light rays matching the colour of the given pixel, while simultaneously modulating their intensity to achieve a desired brightness (namely, according to the intensity values of the different colour components). Throughout the present disclosure, the phrase "light rays having the colour and the intensity representative of the given pixel" refers to light rays of a specific colour and intensity that correspond to the intensity values of the different colour components of the given pixel. As an example, separate red, green and blue lasers can be individually controlled to emit light rays with an appropriate colour and intensity, thereby producing the desired output for the given pixel.

Moreover, optionally, the at least two different colours include a red colour, wherein the plurality of laser light sources comprise two or more red laser light sources that are configured to emit light rays having respective ones of two or more first wavelengths corresponding to the red colour. Optionally, the at least two different colours include a green colour, wherein the plurality of laser light sources comprise two or more green laser light sources that are configured to emit light rays having respective ones of two or more second wavelengths corresponding to the green colour. Optionally, the at least two different colours include a blue colour, wherein the plurality of laser light sources comprise two or more blue laser light sources that are configured to emit light rays having respective ones of two or more third wavelengths corresponding to the blue colour. Employing multiple laser light sources of the same colour, but different wavelengths, has several technical benefits. First, it eliminates the speckling effect caused by a diffraction pattern of a single-wavelength laser. Second, it facilitates tunability for sharp and vivid images. This technical benefit arises from a fact that a laser light source typically emits light of a single wavelength (or a narrow wavelength range about the single wavelength). Thus, employing multiple laser light sources of the same colour, but different wavelengths, allows to produce different shades of the same colour. Third, it provides a wider spectral range for that colour, which can improve colour gamut coverage and enhance colour reproduction accuracy in the displayed images. By selectively modulating the intensity or activation of individual ones of the multiple laser light sources with different wavelengths, it becomes possible to precisely control the blend of emitted light. This not only allows for a broader range of achievable hues within each colour channel (for example, red, green, or blue) but also enables more accurate compensation for variations in components of the display device or environmental lighting conditions. Fourth, this approach reduces metamerism-related issues, where two different light spectra appear visually identical, but behave differently under varying illumination or observation conditions.

Furthermore, optionally, the display device further comprises a colour filter array arranged on an optical path of the at least one light guide, wherein the colour filter array comprises colour filters of the at least two different colours. A technical benefit of employing the colour filter array, even when the laser light sources emit laser rays of a specific colour for a given pixel, is that a colour filter can further enhance colour accuracy by selectively refining and blocking unintended spectral components or stray light. This results in improved colour purity and more precise colour reproduction in the display output. As an example, in a case where the at least two different colours include red, green and blue, the colour filter array could comprise red colour filters, green colour filters and blue colour filters. As another example, in a case where the at least two different colours include red and green, the colour filter array could comprise red colour filters and green colour filters.

Optionally, the colour filter array is arranged adjacent to the at least one light guide. By "adjacent", it is meant that there is a negligible gap between the colour filter array and the at least one light guide. A technical benefit of such an arrangement of the colour filter array is that there is no sub-pixel light leakage in the display device. This eliminates crosstalk (between sub-pixels and pixels), thereby eliminating any ghosting artefacts.

Moreover, optionally, the display device further comprises at least one quantum dot layer arranged on an optical path of the at least one light guide, wherein the at least one quantum dot layer comprises at least one quantum dot material configured to:
  absorb light rays of at least one of the at least two different colours; and
  re-emit the absorbed light rays at a relatively narrower band of wavelengths.

The quantum dot material can be configured as follows:

1. Quantum Dot Composition and Structure

Material Selection: The quantum dot material can be made of semiconductors such as cadmium selenide (CdSe), cadmium telluride (CdTe), indium phosphide (InP), or perovskite quantum dots. The material choice depends on target emission wavelengths and environmental considerations (for example, RoHS compliance for cadmium-free options).

Core-Shell Structure: To enhance optical stability and efficiency, quantum dots (in the at least one quantum dot layer) can be engineered as core-shell structures (for example, a CdSe core with a ZnS shell). The shell provides passivation to minimize surface defects and improve photoluminescence.

Size Tuning: The quantum dots can be synthesized with precise control over their size, as their emission wavelength depends on their size (due to the quantum confinement effect). Smaller quantum dots emit shorter wavelengths, while larger quantum dots emit longer wavelengths.

2. Integration into the Optical Path

Thin Film Coating: The quantum dot material can be deposited as a thin, uniform film on a substrate, or a cover glass, or directly onto an exit surface of the at least one light guide. Techniques such as spin coating, dip coating, or inkjet printing can be used for precise application.

Encapsulation: To protect the quantum dots from environmental factors (for example, oxygen and moisture), the at least one quantum dot layer can be encapsulated using materials like polymer matrices or glass layers. This ensures long-term stability and consistent performance.

Layer Placement: The quantum dot layer can be positioned on the exit surface of the at least one light guide to absorb light exiting from the exit portions of the at least one light guide.

Multi-Layer Configuration: For facilitating multiple emission wavelengths (corresponding to the at least two different colours), multiple quantum dot layers with different size distributions (for example, tuned for red, green, and blue) can be stacked or patterned.

3. Emission Spectrum Control

Absorption Band Adjustment: The quantum dot material can be doped or engineered to absorb a specific range of wavelengths corresponding to the at least one of the at least two different colours.

Narrow Bandwidth Design: The quantum dot material can be engineered to emit light with a full width at half maximum (FWHM) of 20-30 nm or less to achieve high colour purity.

Quantum Yield Maximization: Surface passivation and doping can be employed to improve the quantum yield (for example, measured in terms of the efficiency of light emission relative to absorption), which enhances brightness.

Custom Emission Peaks: The size and material of the quantum dots can be tuned to produce emission peaks at specific wavelengths, such as 640 nm (red), 532 nm (green), and 445 nm (blue), for optimized colour matching in the display device.

4. Compatibility with the Laser Source

Direct Excitation: The quantum dot material can be optimized for direct excitation by the laser wavelengths used in the display device, ensuring efficient light absorption and re-emission.

Beam Shaping: The light rays emitted by the laser light sources can be conditioned (for example, using collimators, light diffusers, or similar) to uniformly illuminate the at least one quantum dot layer, ensuring consistent light conversion across the at least one quantum dot layer.

Employing the at least one quantum dot layer has several technical benefits. First, the quantum dot layer absorbs light rays of a broader spectral range (for example, from at least one of the plurality of laser light sources) and re-emits them at a relatively narrower band of wavelengths (as compared to a band of wavelengths of the light rays absorbed). This improves colour purity and accuracy in the display output by reducing spectral overlap and ensuring highly saturated colors. Second, the quantum dots can be tuned to re-emit specific wavelengths of light with high precision. By re-emitting absorbed light at desired wavelengths, the quantum dot layer enables the display device to achieve a wider colour gamut, covering more of the visible spectrum as compared to conventional display devices. Third, the narrowband emission of quantum dots ensures that more of the emitted light is utilized within the target colour range. This reduces energy loss due to unwanted spectral components and results in higher optical efficiency, contributing to brighter and more vibrant images. Fourth, the quantum dot material can be engineered to emit light at precise wavelengths based on the size and composition of the quantum dots. This tunability allows the display device to achieve optimal colour matching for specific applications, enhancing the versatility of the display device. Fifth, by absorbing and re-emitting light at relatively narrow spectral bands, the quantum dot layer minimizes crosstalk between adjacent colors (for example, red, green, and blue) in the optical path. This leads to cleaner, sharper transitions between colors, enhancing image clarity. Sixth, the quantum dot layer can absorb and modify light rays from different sources, including those with broader or slightly imprecise spectra. This makes the display device more adaptable and compatible with diverse light source configurations, including multimode laser sources.

Furthermore, throughout the present disclosure, the term "light guide" refers to an optical component that is configured to guide light rays received at its light inlet towards a given exit portion of its light outlet at a given time instant. The light rays then exit from the given exit portion along an optical path of the display device. The plurality of exit portions correspond to a plurality of pixels of the display device.

In some implementations, the at least one light guide is implemented as a single light guide. In other implementations, the at least one light guide is implemented as at least two light guides corresponding to respective ones of the at least two different colours, wherein the at least two light guides are stacked as layers. As an example, the at least two different colours could include a red colour, a green colour and a blue colour, wherein the plurality of laser light sources comprise at least one red laser light source, at least one green laser light source and at least one blue laser light source. In such a case, the at least one light guide could be implemented as a first light guide, a second light guide and a third light guide corresponding to the red colour, the green colour and the blue colour. In other words, a light inlet of the first light guide is arranged to receive light rays emitted by the red laser light source, a light inlet of the second light guide is arranged to receive light rays emitted by the green laser light source, and a light inlet of the third light guide is arranged to receive light rays emitted by the blue laser light source. One such example implementation has been illustrated in conjunction with FIG. 1E. Employing separate light guides for separate colours has several technical benefits.

First, by dedicating separate light guides to specific colors (for example, red, green, and blue), the risk of colour mixing or crosstalk between different colour channels is minimized.

This results in improved colour separation, leading to higher colour purity and better image quality. This also allows to generate sub-pixels corresponding to different colour components of the given pixel. Second, each colour-specific light guide allows precise control over the light propagation for its respective colour. This ensures efficient delivery of light from the laser light sources, maximizing brightness for each colour channel and improving overall luminance. Third, stacking light guides simplifies the optical design for additive colour mixing. Each light guide delivers light of a single colour directly to its target area (namely, a specific exit portion at a given time instant), and the layers naturally combine at the display output without requiring complex optical elements like dichroic mirrors for intermediate mixing. Fourth, the dedicated light inlets for each light guide ensure that the emitted light from the laser sources is efficiently coupled into the respective guide. This reduces scattering and reflection losses, improving overall optical efficiency. Fifth, the stacking of light guides enables a compact design by using the vertical space efficiently. This layered configuration is ideal for applications with strict size constraints, such as heads-up displays (HUDs) or wearable devices. Sixth, separate light guides for each colour allow independent optimization of each channel. As an example, material selection for each guide can be tailored to the wavelength it carries (e.g., using materials with high transmission efficiency for red, green, or blue light). As another example, thickness and geometry of each light guide can be customized for optimal light propagation based on the wavelength. Seventh, the physical separation of light guides reduces the likelihood of interference or stray light artifacts, which can occur in a shared light guide implementation. This results in cleaner and sharper images. Eighth, this implementation is easily scalable to support more than three colors, such as systems using additional wavelengths (for example, cyan, magenta, or yellow). Additional light guides can simply be added to the stack for extended colour gamut or specialized applications. Ninth, the dedicated light inlets for each light guide simplify the alignment process during manufacturing and assembly. Misalignment in one colour channel does not affect the others, improving the robustness of the display device. Tenth, this design is particularly beneficial for high-precision displays requiring accurate colour reproduction and sharp transitions, such as augmented reality (AR) displays, or HUDs.

Moreover, in some implementations, the light outlet of the at least one light guide spans across an entirety of an image plane of the display device, irrespective of whether the at least one light guide is implemented as a single light guide for all the colours or as separate light guides for separate colours. In other implementations, the at least one light guide comprises a plurality of light guides whose respective light outlets span across corresponding portions of the image plane of the display device. In such implementations, the plurality of laser light sources comprises multiple sets of laser light sources corresponding to respective ones of the plurality of light guides. In such an implementation, a light inlet of each light guide is arranged to receive light rays emitted by a corresponding set of laser light sources, and said light guide is controlled to sequentially guide the light rays towards different exit portions of a light outlet of said light guide. One such example implementation has been illustrated in conjunction with FIG. 1F. A technical benefit of having the plurality of light guides is that the image can be displayed relatively quickly, thereby allowing for higher frame rates. This immensely improves the user's viewing experience by making the visual scene more realistic and immersive.

Furthermore, as mentioned earlier, the aforesaid steps (i) to (iii) are repeated for individual ones of the plurality of pixels in the image. Notably, these steps are performed for the plurality of pixels in a sequential manner. It will be appreciated that a sequence in which the plurality of pixels are considered for repeating the steps (i) to (iii) is not limited to a particular scanning pattern. Said sequence can be selected based on a predefined scanning pattern. As an example, in case of a raster scanning pattern, the pixels can be considered in a line-by-line manner across the light outlet of the at least one light guide. As another example, in case of a Lissajous scanning pattern, the pixels can be considered based on a sinusoidal input. As yet another example, in case of a vector scanning pattern, the pixels can be considered based on a geometric shape of at least one virtual object represented in the image. A technical benefit of employing the vector scanning pattern is that in a case where the at least one virtual object is represented by only a small portion of the image (namely, leaving a large remaining portion of the image empty), the image can be displayed in a time-efficient and computation-efficient manner.

In this way, the at least one light guide is controlled to guide light rays received at the light inlet towards a given exit portion of the light outlet at a given time instant. Thus, the at least one light guide is controlled effectively when the steps (i) to (iii) are repeated in quick succession for the plurality of pixels.

In this regard, the at least one light guide can be configured to first selectively guide the light rays along a given row (or a given column) on which a given exit portion lies, and then selectively re-guide the light rays to exit from the given exit portion. Such configuring can be implemented in various ways that are well-known in the art. For brevity, some of the various ways will now be described only briefly, without limiting the at least one light guide to such implementations only.

In one example implementation, an individual one of the at least one light guide can be implemented as a multi-layered light guide. In such an implementation, the multi-layered light guide is divided into a plurality of layers that are aligned with respective ones of a plurality of rows (or a plurality of columns). By controlling at least one of: an entry point at the light inlet, an angle of incidence of the light rays at the light inlet, one or more wavelengths of the light rays, different layers of the multi-layered light guide can be activated at different time instants. When a given layer is activated, the light rays (upon entering the light inlet) are directed towards a corresponding row (or a corresponding column). Additionally, each row (or each column) may have a plurality of controllable microstructures (for example, such as controllable micro-mirrors, controllable micro-prisms, or similar) arranged therein. A given microstructure is controlled to re-direct the light rays to exit from a corresponding exit portion.

In another example implementation, an individual one of the at least one light guide can be implemented to have an array of controllable microstructures. In such an implementation, microstructures arranged along a first direction (namely, a direction in which the light rays travel upon entering the light inlet) are controlled to direct the light rays along a second direction that is perpendicular to the first direction. Subsequently, microstructures arranged along the second direction are controlled to re-direct the light rays to exit from a corresponding exit portion.

In yet another example implementation, an individual one of the at least one light guide can be implemented to have diffractive optical elements (DOE). The DOEs can be integrated within or on a surface of the individual one of the at least one light guide to direct the light rays towards a given row (or a given column), based on at least one of: an angle of incidence of the light rays at the DOEs, one or more wavelengths of the light rays. Moreover, these DOEs can be controllable. Furthermore, each row (or each column) may have a plurality of controllable microstructures arranged therein, wherein a given microstructure is controlled to re-direct the light rays to exit from a corresponding exit portion. Alternatively, each row (or column) may also have controllable DOEs that are controlled to re-direct the light rays to exit from a corresponding exit portion.

In still another example implementation, an individual one of the at least one light guide can be implemented to employ micro-electro-mechanical system (MEMS) elements. Such MEMS elements can be controlled to direct the light rays along a given row (or a given column), and then to re-direct the light rays to exit from a given exit portion.

Moreover, it will be appreciated that the at least one light guide can be implemented as a transparent light guide. A technical benefit of such an implementation is that it makes the display device suitable to be used as a transparent display. Such a transparent display can be integrated into a windshield or other windows of a vehicle, to facilitate an HUD, without a need for any optical combiner.

In order to implement the at least one light guide as a transparent light guide, following considerations can be taken into account:

1. Material Transparency:

The at least one light guide can be made from highly-transparent materials (for example, such as specific grades of acrylic or glass), which minimize light absorption and scattering to provide high optical clarity and visibility through the at least one light guide. Moreover, the at least one light guide can have an anti-reflective coating or polished surfaces, to enhance the transparency by reducing glare and reflection.

2. Light Extraction Mechanism:

Light guide elements (for example, such as microstructures, DOEs, MEMS elements, or similar) implemented in the at least one light guide can be designed to extract light efficiently, while minimizing visual obstruction when the at least one light guide is not actively illuminated. As mentioned earlier, such light guide elements guide the light rays to corresponding rows (or columns) and corresponding exit portions, without diffusing the light rays across an entirety of the light outlet of the at least one light guide. Moreover, the light guide elements can be designed to remain almost invisible under ambient lighting conditions to preserve optical transparency.

3. Thickness

The at least one light guide can be designed to be thin and have minimal impact on an overall transparency. In this regard, the at least one light guide allows ambient light to pass through, enabling clear visibility of the real-world environment therethrough.

Furthermore, the at least one light guide could optionally include a cover glass or a similar protective layer to minimize reflections and provide physical protection to the at least one light guide. The cover glass can be designed with anti-reflective coatings to reduce glare and improve the efficiency of light transmission. Additionally, it serves as a protective barrier, shielding the at least one light guide from dust, scratches, and environmental factors, thereby enhancing durability and ensuring consistent optical performance over time.

The present disclosure also relates to the system as described above. Various embodiments and variants disclosed above, with respect to the aforementioned first aspect, apply mutatis mutandis to the system.

The optical combiner can be implemented as at least a part of a windshield or other windows of a vehicle. By "at least a part", it is meant that the optical combiner can also be implemented as an entirety of the windshield or the other windows. This allows the system to be implemented as an HUD in the vehicle. The optical combiner could be implemented as at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to the image plane of the display device lies in a range of 10 degrees and 75 degrees.

The at least one processor of the system controls an overall operation of the system. The at least one processor is communicably coupled to the display device. Optionally, the at least one processor is implemented as the processor of the display device. Alternatively, optionally, the at least one processor is implemented as a processor of a computing device that is communicably coupled to the display device. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

In some implementations, the system further comprises a tracker and a multiscopic optical element arranged on the optical path of the display device, wherein the at least one processor is configured to:

determine a relative location of a first eye and of a second eye of the at least one user with respect to the optical combiner, by utilising the tracker, wherein the image is a light field image that is generated or retrieved based on the relative location of the first eye and of the second eye of the at least one user with respect to the optical combiner; and control the multiscopic optical element, based on the relative location of the first eye and of the second eye of the at least one user with respect to the optical combiner, to direct light rays corresponding to a first set of pixels and a second set of pixels of the light field image to produce a first part and a second part of the synthetic light field, respectively, for the first eye and the second eye of the at least one user.

In some implementations, the at least one user is a single user. In other implementations, the at least one user is a plurality of users. It will be appreciated that the step of determining the relative location, the step of generating or retrieving the image, and the step of controlling the multiscopic optical element have been described with respect to an individual one of the at least one user. This means that these steps can be performed similarly for each individual one of the at least one user (including a case of the plurality of users).

Throughout the present disclosure, the term "tracker" refers to specialised equipment for detecting and/or following a location of eyes of a given user. The given user encompasses each individual one of the at least one user. Optionally, the tracker is implemented as at least one tracking camera. The at least one tracking camera may comprise at least one of: at least one visible-light camera, at least one infrared (IR) camera, at least one depth camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, and the at least one depth camera) may be utilised in the tracker. When different types of images captured by the various different types of tracking cameras are utilised, a location of the user's eyes can be determined highly accurately, as results obtained from one type of image can be used to refine results obtained from another type of image. Herein, these different types of images constitute tracking data collected by the tracker, and may be in the form of at least one of: visible-light images, IR images, depth images.

It will be appreciated that the at least one tracking camera is arranged to face the given user, to facilitate tracking of the location of the eyes of the given user. A relative location of the at least one tracking camera with respect to the optical combiner is pre-known. This enables to determine the relative location of the eyes of the given user with respect to the optical combiner. Optionally, in this regard, when the tracker are utilised to detect and/or follow the location of the eyes of the given user, a location of the eyes of the given user with respect to the at least one tracking camera is accurately known. Thus, the relative location of the eyes of the given user with respect to the optical combiner can be determined, based on the relative location of the at least one tracking camera with respect to the optical combiner, and the location of the eyes of the given user with respect to the at least one tracking camera. Such a determination may utilise a coordinate geometry-based technique and/or a trigonometry-based technique. It will be appreciated that in autostereoscopic and multiscopic implementations of the system, the tracker tracks the eyes of the given user with a significantly high accuracy and precision, such that an error in determining the relative location may, for example, be minimised to within a tolerance range of approximately (+/−) 8 millimetres.

As mentioned earlier, the light field image is generated or retrieved based on the relative location of the first eye and of the second eye of the at least one user with respect to the optical combiner. The light field image may be understood to be a 2D image comprising a plurality of pixels, wherein a first set of pixels from amongst the plurality of pixels is responsible for generating the first part of the synthetic light field that corresponds to the first eye of the at least one user, and a second set of pixels from amongst the plurality of pixels is responsible for generating the second part of the synthetic light field that corresponds to the second eye of the at least one user. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal field of view of the light field image, wherein each vertical stripe comprises one or more lines of pixels. This is because humans perceive depth mainly based on horizontal binocular parallax. Thus, in this way, the light field image would be considerably different as compared to a conventional 2D image that is displayed via conventional 2D displays, because the same light field image would comprise visual information corresponding to the first eye as well as the second eye of the at least one user.

In this regard, the light field image can be generated from a first image and a second image that are to be presented to the first eye and the second eye of the at least one, respectively. In some implementations, the at least one processor is configured to generate the first image and the second image from a perspective of the relative location of the first eye and of the second eye of the at least one user with respect to the optical combiner, by employing a 3D model of at least one virtual object. It will be appreciated that the relative location of the first eye and of the second eye with respect to the optical combiner indicates a viewing direction of the first eye and a viewing direction of the second eye, respectively. Therefore, the first image and the second image are generated based on these viewing directions. Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to obtain the first image and the second image in a form of 2D user interface (UI) elements. The 2D UI elements could pertain to, for example, a virtual navigation tool, a virtual gadget, a virtual message, a virtual entity, a virtual entertainment media, a virtual information, or similar.

In some implementations, the multiscopic optical element can be implemented as a part of the display device. In other implementations, the multiscopic optical element can be implemented as a separate element. Irrespective of whether the multiscopic optical element is implemented as a part of the display device or as a separate element, the multiscopic optical element can be implemented as a controllable lenticular array, a controllable parallax barrier, or similar. The controllable parallax barrier can be implemented as any one of: a switchable liquid crystal (LC) shutter array, a switchable LC barrier, a transparent/diffuse switchable film (for example, made of a polymer-dispersed liquid crystal (PDLC)). Controlling such multiscopic optical elements based on the relative location of the eyes is well-known in the art.

Furthermore, it will be appreciated that the plurality of laser light sources produce collimated light rays. Herein, the term "collimated light rays" encompasses fully-collimated light rays as well as near-collimated light rays. By "near-collimated light rays", it means that an angle formed by such light rays with respect to a predefined direction of collimation is less than a predefined angle. This predefined angle may, for example, lie within a range of 10 degrees to 30 degrees.

Due to the inherent collimated nature of the light rays emitted by the plurality of laser light sources, it may be difficult for the display device and the system to create a relatively large viewing zone without any additional optical element. The term "viewing zone" refers to a 3D zone within which a user's eyes can be positioned to see the image clearly. Optionally, in this regard, the system further comprises an optical spreader arranged on the optical path of the display device, wherein the optical spreader is employed to spread individual ones of the light rays. A technical benefit of employing the optical spreader is that it allows for expanding the viewing zone of the display device.

The optical spreader can be implemented as a light diffuser or a similar optical element that is configured to spread light. In some implementations, the optical spreader can be implemented as a part of the display device. In other implementations, the optical spreader can be implemented as a separate element.

Optionally, the optical spreader is arranged between the display device and the multiscopic optical element. A technical benefit of this is that spreading of the light rays (by the optical spreader) in such an arrangement does not interfere with the parallax effect created by the multiscopic optical element.

The optical spreader can be beneficially designed to have a high transmittance, thereby allowing for reduction in light wastage. The technical effect of high transmittance can be achieved by implementing the optical spreader in various possible ways. As an example, the optical spreader can be implemented as a light diffuser having a plurality of micro lenses on a surface of the light diffuser. In such a case, the plurality of micro lenses are shaped depending on the diffusion angle. In this regard, a given micro lens is shaped to bend light rays incident thereupon according to the diffusion angle and a location of the given micro lens in the light diffuser. Notably, an angle of bending varies across the light diffuser, such that the angle of bending is larger for those micro lenses that lie in a proximity of a periphery of the light diffuser as compared to other micro lenses that lie in a central portion of the light diffuser. Moreover, the light rays emitted by adjacent regions of the display device are diffused in a manner that they do not overlap with each other upon diffusion.

The present disclosure further relates to the method as described above. Various embodiments and variants disclosed above, with respect to the aforementioned first aspect, apply mutatis mutandis to the method.

Optionally, the at least two different colours include a red colour, and wherein the plurality of laser light sources comprise two or more red laser light sources that are configured to emit light rays having respective ones of two or more first wavelengths corresponding to the red colour. Optionally, the at least two different colours include a green colour, and wherein the plurality of laser light sources comprise two or more green laser light sources that are configured to emit light rays having respective ones of two or more second wavelengths corresponding to the green colour. Optionally, the at least two different colours include a blue colour, and wherein the plurality of laser light sources comprise two or more blue laser light sources that are configured to emit light rays having respective ones of two or more third wavelengths corresponding to the blue colour. Employing multiple laser light sources of the same colour, but different wavelengths, has several technical benefits. First, it eliminates the speckling effect caused by a diffraction pattern of a single-wavelength laser. Second, it facilitates tunability for sharp and vivid images, and allows to produce different shades of the same colour. Third, it provides a wider spectral range for that colour, which can improve colour gamut coverage and enhance colour reproduction accuracy in the displayed images.

Moreover, optionally, the display device further comprises a colour filter array arranged on an optical path of the at least one light guide, wherein the colour filter array comprises colour filters of the at least two different colours. A technical benefit of employing the colour filter array, even when the laser light sources emit laser rays of a specific colour for a given pixel, is that a colour filter can further enhance colour accuracy by selectively refining and blocking unintended spectral components or stray light. This results in improved colour purity and more precise colour reproduction in the display output.

Furthermore, optionally, the display device further comprises at least one quantum dot layer arranged on an optical path of the at least one light guide, wherein the at least one quantum dot layer comprises at least one quantum dot material configured to absorb light rays of at least one of the at least two different colours, and re-emit the absorbed light rays at a relatively narrower band of wavelengths. Employing the at least one quantum dot layer has several technical benefits, as mentioned earlier.

Moreover, the at least one light guide is implemented as at least two light guides corresponding to respective ones of the at least two different colours, wherein the at least two light guides are stacked as layers. Employing separate light guides for separate colours has several technical benefits, as mentioned earlier.

Furthermore, the method further comprises employing an optical combiner, arranged on an optical path of the display device and on an optical path of a real-world light field of a real-world environment, to reflect the synthetic light field towards eyes of at least one user, whilst optically combining the real-world light field with the synthetic light field.

Additionally, optionally, the method further comprises:
determining a relative location of a first eye and of a second eye of the at least one user with respect to the optical combiner, wherein the image is a light field image that is generated or retrieved based on the relative location of the first eye and of the second eye of the at least one user with respect to the optical combiner; and
controlling a multiscopic optical element arranged on the optical path of the display device, based on the relative location of the first eye and of the second eye of the at least one user with respect to the optical combiner, to direct light rays corresponding to a first set of pixels and a second set of pixels of the light field image to produce a first part and a second part of the synthetic light field, respectively, for the first eye and the second eye of the at least one user.

Moreover, optionally, the method further comprises employing an optical spreader, arranged on an optical path of the display device, to spread individual ones of the light rays. A technical benefit of employing the optical spreader is that it allows for expanding the viewing zone of the display device.

DETAILED DESCRIPTION OF THE DRAWINGS

Figure 1A:
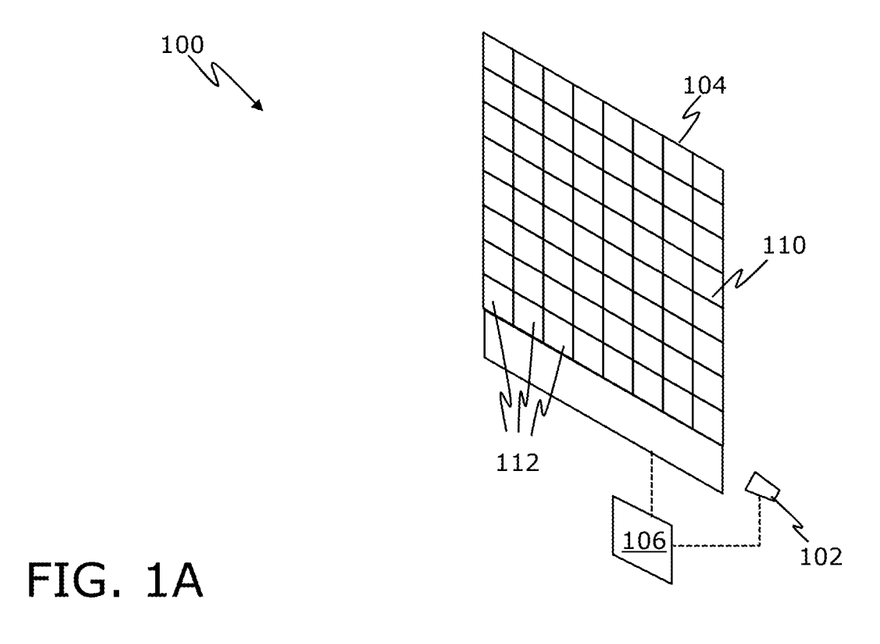
Figure 1B:
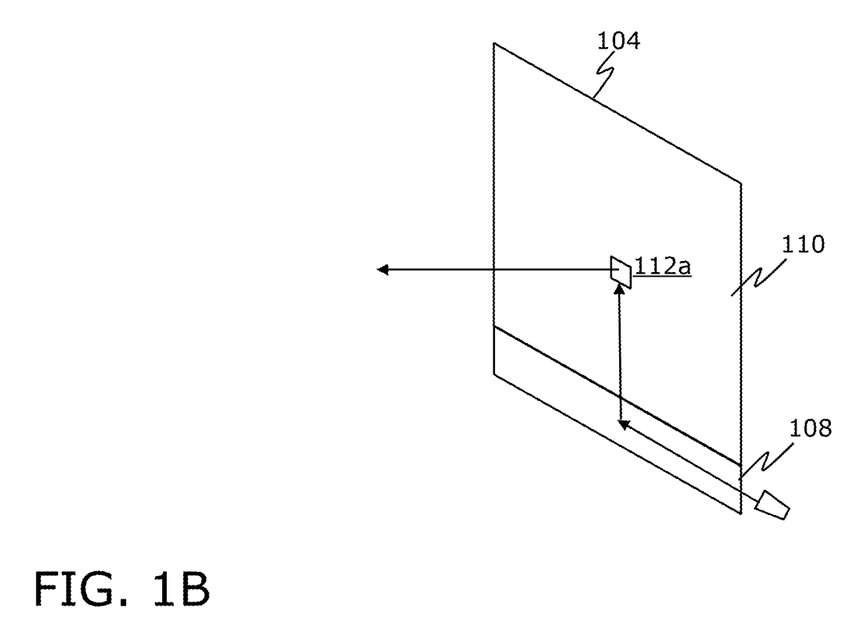
Figure 1C:
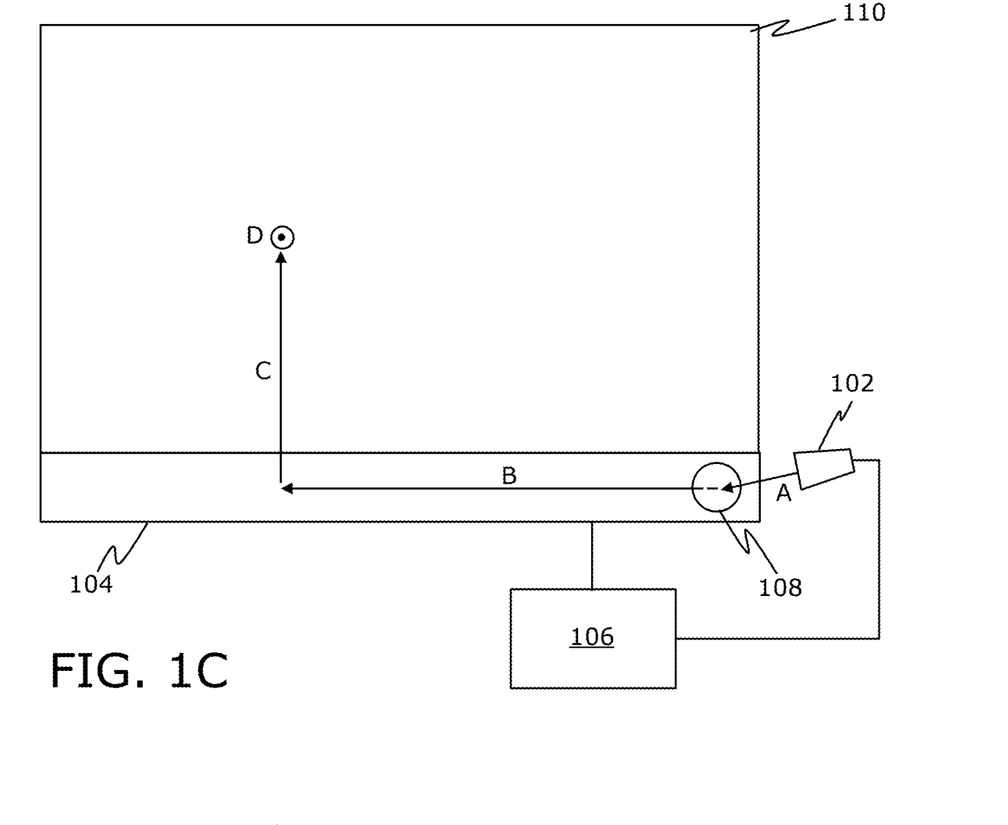
FIGS. 1C and 1D are a front view and a bottom view of the display device, respectively, in accordance with an embodiment of the present disclosure.
Figure 1D:
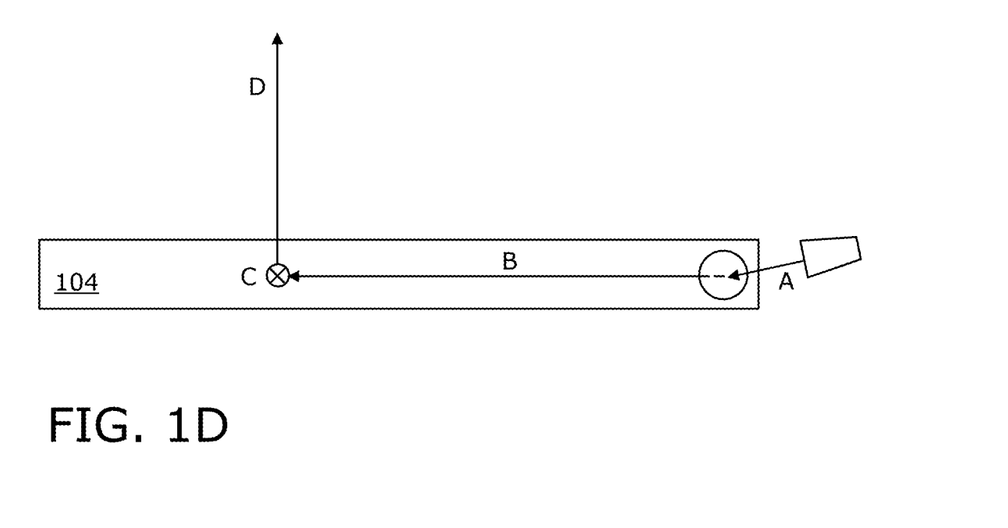

FIGS. 1A and 1B are simplified views of a display device 100, while FIGS. 1C and 1D are a front view and a bottom view of the display device 100, respectively, in accordance with an embodiment of the present disclosure. The display device 100 comprises a plurality of laser light sources (depicted as laser light sources 102) of at least two different colours, at least one light guide (depicted as a single light guide 104), and a processor 106. The light guide 104 comprises a light inlet 108 and a light outlet 110, the light outlet 110 comprising a plurality of exit portions 112. The light inlet 108 is arranged to receive light rays emitted by the laser light sources 102. The light guide 104 is controllable to sequentially guide the light rays towards different ones of the exit portions 112. The processor 106 is configured to:
  obtain an image to be displayed via the display device 100; and
  display the image via the display device 100 for producing a synthetic light field, wherein when displaying the image, the processor 106 is configured to display a given pixel of the image by:
    (i) determining a given exit portion 112a of the light outlet 110 corresponding to the given pixel, based on a location of the given pixel in the image;
    (ii) controlling the laser light sources 102 to emit light rays having a colour and an intensity representative of the given pixel, based on intensity values of different colour components of the given pixel in the image; and
    (iii) controlling the light guide 104 to guide the light rays towards the given exit portion 112a from which the light rays exit.

With reference to FIGS. 1B, 1C and 1D, there is shown using arrows how light rays emitted by the laser light sources 102 are directed by the light guide 104, to exit the given exit portion 112a of the light guide 104. Different parts A, B, C and D of an optical path of the light rays are marked in FIGS. 1C and 1D. The part A corresponds to an entry of the light rays (upon emission from the laser light sources 102) into the light guide 104 via the light inlet 108. The parts B and C correspond to directing the light rays towards a given row (or a given column) of the light guide 104 on which the given exit portion 112a lies, and guiding the light rays towards the given exit portion 112a. The part D corresponds to re-directing the light rays to exit from the given exit portion 112a of the light guide 104.

Figure 1E:
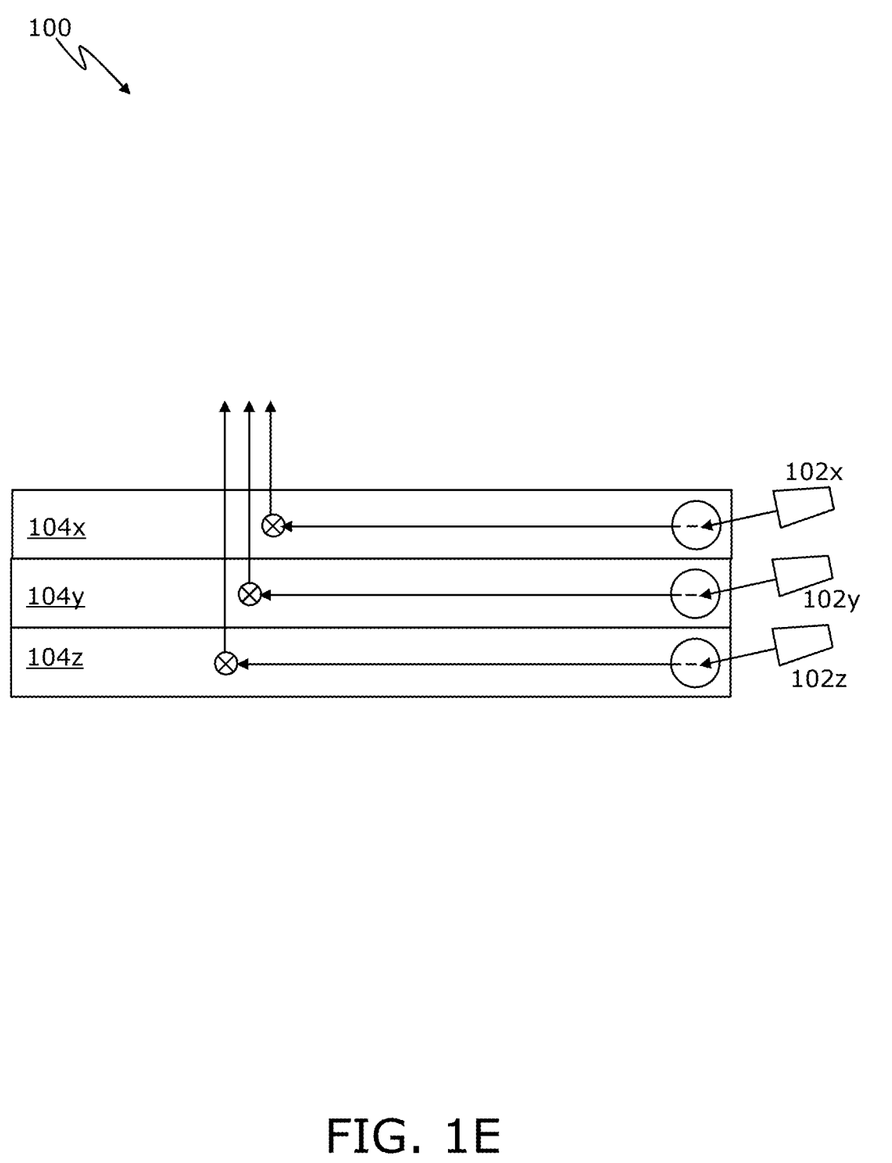
FIG. 1E is a bottom view of the display device in a first specific implementation, in accordance with an embodiment of the present disclosure.

Referring to FIG. 1E, illustrated is a bottom view of the display device 100 in a first specific implementation, in accordance with an embodiment of the present disclosure. In the first specific implementation, the at least one light guide is implemented as at least two light guides corresponding to respective ones of the at least two different colours, wherein the at least two light guides are stacked as layers. For illustration purposes only, the at least two different colours are shown to include a red colour, a green colour and a blue colour. Accordingly, the plurality of laser light sources 102 comprise at least one red laser light source 102x, at least one green laser light source 102y and at least one blue laser light source 102z. In such a case, the at least one light guide could be implemented as a first light guide 104x, a second light guide 104y and a third light guide 104z corresponding to the red colour, the green colour and the blue colour. As shown, the first light guide 104x, the second light guide 104y and the third light guide 104z are stacked as layers. Corresponding light inlets of the first light guide 104x, the second light guide 104y and the third light guide 104z are arranged to receive light rays emitted by the red laser light source 102x, the green laser light source 102y and the blue laser light source 102z, respectively. The first light guide 104x, the second light guide 104y and the third light guide 104z are controlled to guide their corresponding light rays towards their respective exit portions (corresponding to a given pixel of an image), from where the light rays exit.

Figure 1F:
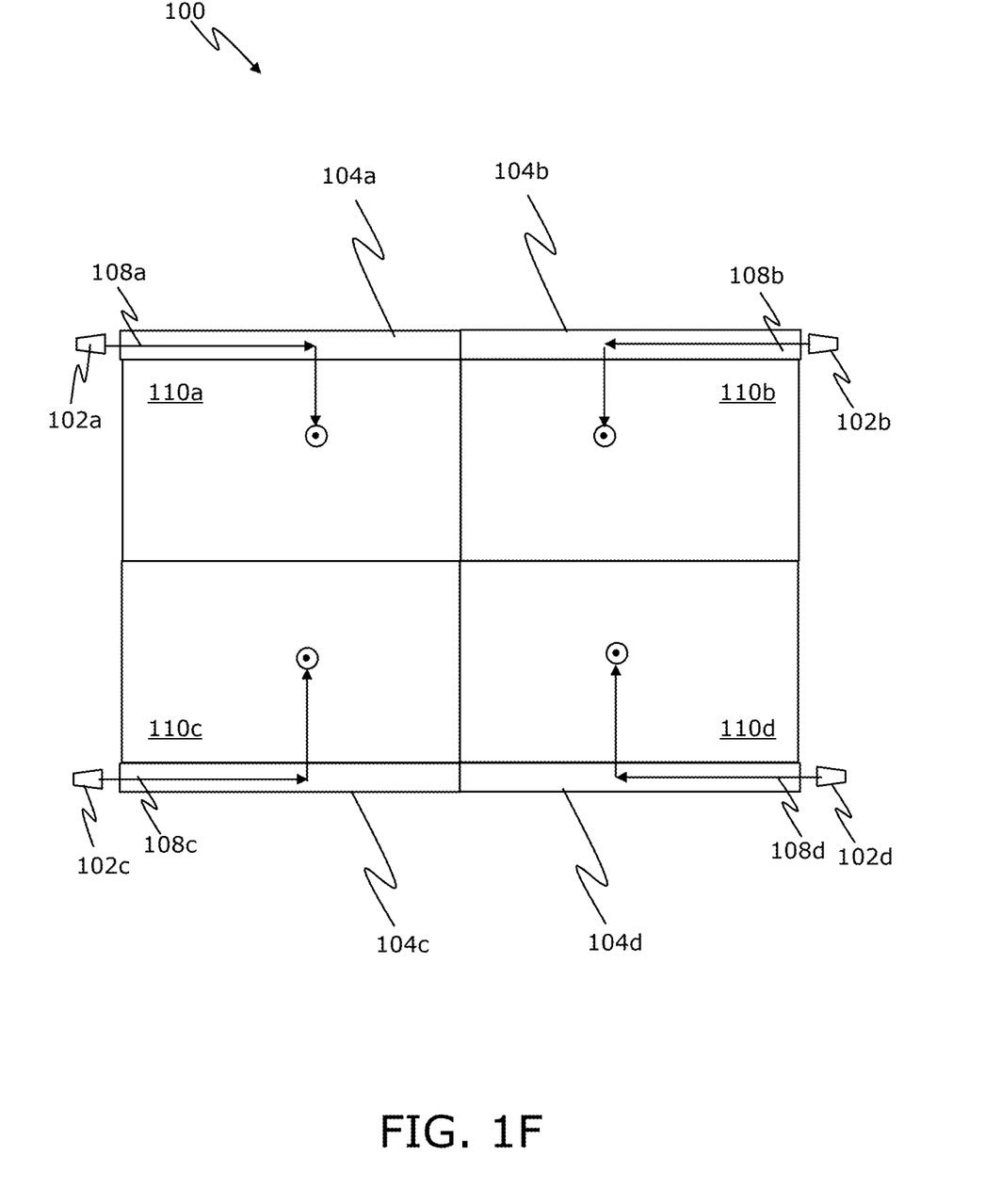
FIG. 1F depicts a front view of the display device in a second specific implementation, in accordance with an embodiment of the present disclosure.

Referring to FIG. 1F, illustrated is a front view of the display device 100 in a second specific implementation, in accordance with an embodiment of the present disclosure. In the second implementation, the at least one light guide comprises a plurality of light guides 104a-104d, and the plurality of laser light sources comprises multiple sets of laser light sources 102a-102d corresponding to respective ones of the plurality of light guides 104a-104d. A light inlet 108a-108d of each light guide 104a-104d is arranged to receive light rays emitted by a corresponding set of laser light sources 102a-102d. Each light guide 104a-104d is controlled to guide the light rays towards a given exit portion of a corresponding light outlet 110a-110d, from which the light rays exit.

Figure 1G:
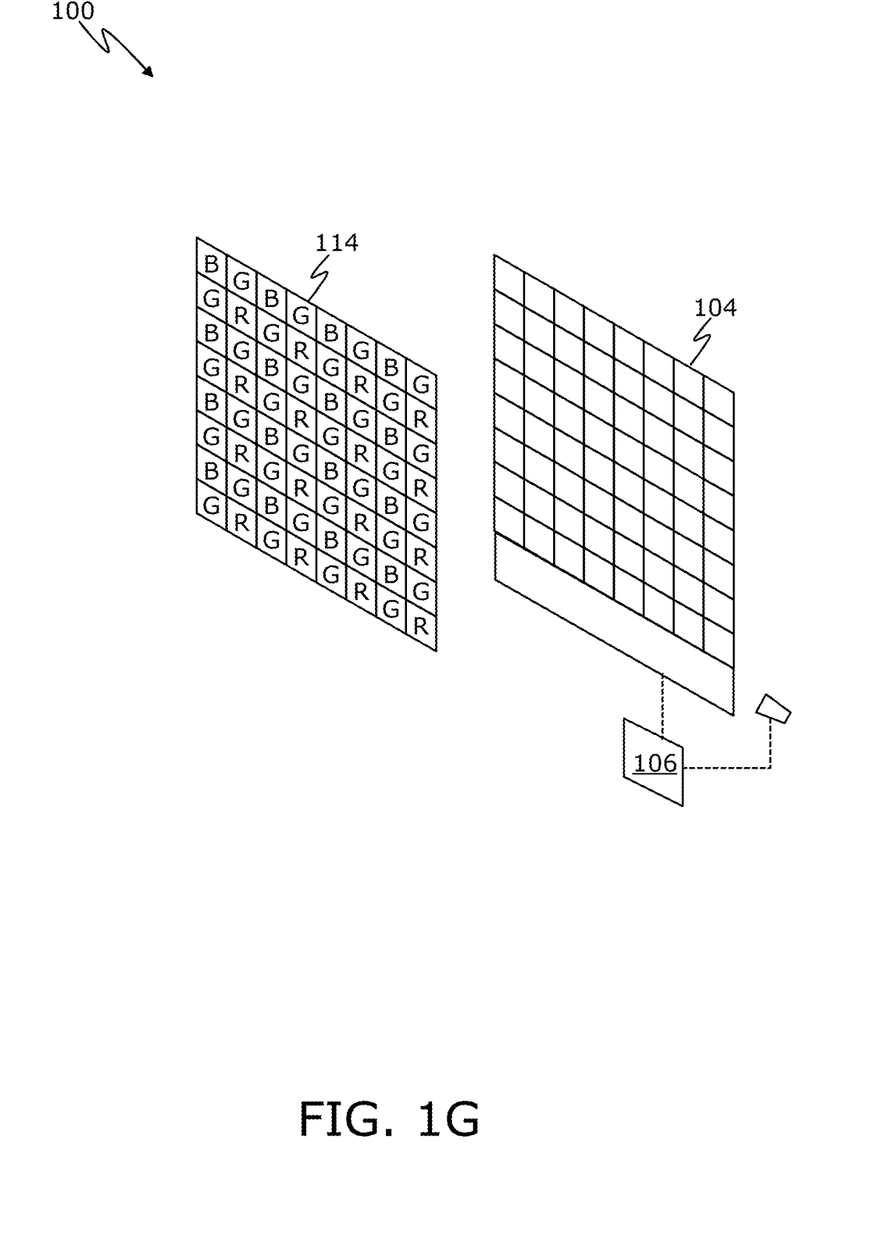
FIG. 1G depicts an exploded view of the display device in a third specific implementation, in accordance with an embodiment of the present disclosure.

Referring next to FIG. 1G, illustrated is an exploded view of the display device 100 in a third specific implementation, in accordance with an embodiment of the present disclosure. In the third implementation, the display device 100 further comprises a colour filter array 114 comprising colour filters of the at least two different colours. For illustration purposes only, the colour filters of the colour filter array 114 are shown as red, green and blue colour filters (marked with R, G and B).

It may be understood by a person skilled in the art that FIGS. 1A-1G merely depict various example implementations (out of many possible implementations) of the display device 100, for sake of clarity, which should not unduly limit the scope of the claims herein. It is to be understood that the specific implementation of the display device 100 is not to be construed as limiting it to specific numbers or types of laser light sources, light guides, and processors. The person skilled in the art will recognize many variations, alternatives, and modifications of embodiments of the present disclosure.

Figure 2:
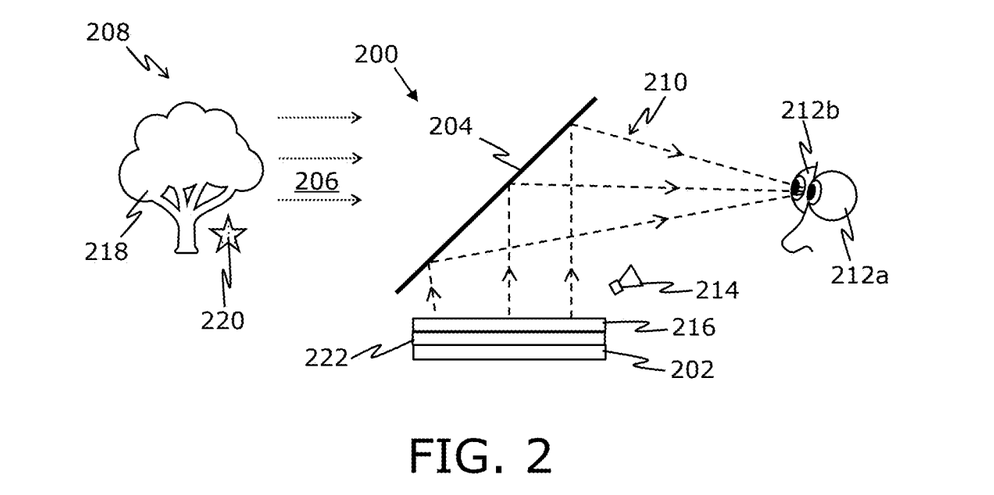
FIG. 2 depicts an exemplary environment in which a system for displaying images can be employed, in accordance with an embodiment of the present disclosure.

Referring to FIG. 2, illustrated is an exemplary environment in which a system 200 for displaying images can be employed, in accordance with an embodiment of the present disclosure. The system 200 comprises a display device 202 (according to the aforementioned first aspect), an optical combiner 204 and at least one processor (not shown). The optical combiner 204 is arranged on an optical path of the display device 202 and on an optical path of a real-world light field 206 of a real-world environment 208. The at least one processor is configured to:
  generate or retrieve an image to be displayed via the display device 202; and
  send the image to be displayed to the display device 202, wherein the display device 202 is employed to display the image for producing a synthetic light field 210, and wherein the optical combiner 204 is employed to reflect the synthetic light field 210 towards eyes 212a-212b of at least one user, whilst optically combining the real-world light field 206 with the synthetic light field 210.

Moreover, optionally, the system 200 further comprises a tracker 214 and a multiscopic optical element 216 arranged on the optical path of the display device 202. The at least one processor is configured to:

determine a relative location of a first eye 212a and of a second eye 212b of the at least one user with respect to the optical combiner 204, by utilising the tracker 214, wherein the image is a light field image that is generated or retrieved based on the relative location of the first eye 212a and of the second eye 212b of the at least one user with respect to the optical combiner 204; and control the multiscopic optical element 216, based on the relative location of the first eye 212a and of the second eye 212b of the at least one user with respect to the optical combiner 204, to direct light rays corresponding to a first set of pixels and a second set of pixels of the light field image to produce a first part and a second part of the synthetic light field 210, respectively, for the first eye 212a and the second eye 212b of the at least one user.

In the real-world environment 208, there are one or more real-world objects, depicted as a real-world object 218 (shown as a tree, for illustration purposes only). The first part and the second part of the synthetic light field 210 present at least one virtual object, depicted as a virtual object 220 (shown as a star, for illustration purposes only). Furthermore, optionally, the system also comprises an optical spreader 222 arranged on the optical path of the display device 202, wherein the optical spreader 222 is employed to spread individual ones of the light rays.

FIGS. 1A-1G and 2 are merely examples, which should not unduly limit the scope of the claims herein. A person skilled in the art will recognize many variations, alternatives, and modifications of embodiments of the present disclosure.

Figure 3:
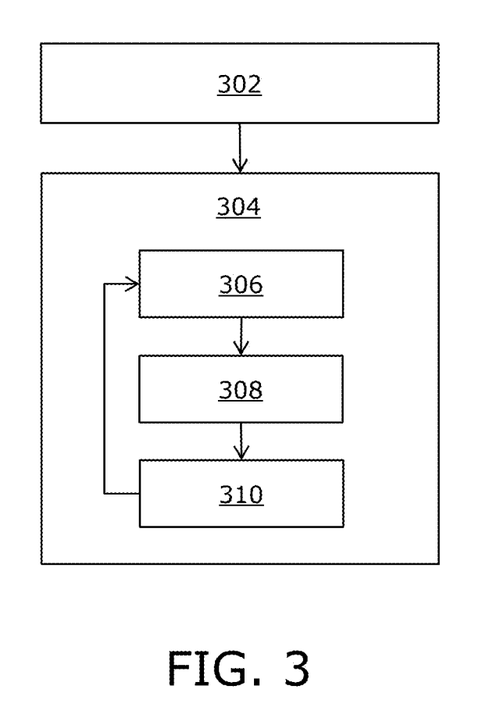
FIG. 3 depicts steps of a method for displaying images, in accordance with an embodiment of the present disclosure.

Referring to FIG. 3, illustrated are steps of a method for displaying images, in accordance with an embodiment of the present disclosure. At step 302, an image to be displayed via a display device is obtained. The display device comprises a plurality of laser light sources of at least two different colours and at least one light guide comprising a light inlet and a light outlet, the light outlet comprising a plurality of exit portions. The light inlet is arranged to receive light rays emitted by the plurality of laser light sources. The at least one light guide is controllable to sequentially guide the light rays towards different exit portions of the light outlet.

At step 304, the image is displayed via the display device for producing a synthetic light field. The step 304 comprises steps 306, 308 and 310. At step 306, a given exit portion of the light outlet corresponding to a given pixel is determined, based on a pixel location of the given pixel in the image. At step 308, the plurality of laser light sources are controlled to emit light rays having a colour and an intensity representative of the given pixel, based on intensity values of different colour components of the given pixel in the image. At step 310, the at least one light guide is controlled to guide said light rays towards the given exit portion from which the light rays exit. The steps 306, 308 and 310 are repeated for individual ones of a plurality of pixels of the image.

The aforementioned steps are only illustrative and other alternatives can also be provided where one or more steps are added, one or more steps are removed, or one or more steps are provided in a different sequence without departing from the scope of the claims herein.

The invention claimed is:

1. A display device comprising:
   a plurality of laser light sources of at least two different colours;
   at least one light guide comprising a light inlet and a light outlet, the light outlet comprising a plurality of exit portions, wherein the light inlet is arranged to receive light rays emitted by the plurality of laser light sources, and wherein the at least one light guide is controllable to sequentially guide the light rays towards different exit portions of the light outlet; and
   a processor configured to:
      obtain an image to be displayed via the display device; and
      display the image via the display device for producing a synthetic light field, wherein when displaying the image, the processor is configured to display a given pixel of the image by:
         (i) determining a given exit portion of the light outlet corresponding to the given pixel, based on a pixel location of the given pixel in the image;
         (ii) controlling the plurality of laser light sources to emit light rays having a colour and an intensity representative of the given pixel, based on intensity values of different colour components of the given pixel in the image; and
         (iii) controlling the at least one light guide to guide said light rays towards the given exit portion from which the light rays exit.

2. The display device of claim 1, wherein the at least two different colours include a red colour, and wherein the plurality of laser light sources comprise two or more red laser light sources that are configured to emit light rays having respective ones of two or more first wavelengths corresponding to the red colour.

3. The display device of claim 1, wherein the at least two different colours include a green colour, and wherein the plurality of laser light sources comprise two or more green laser light sources that are configured to emit light rays having respective ones of two or more second wavelengths corresponding to the green colour.

4. The display device of claim 1, wherein the at least two different colours include a blue colour, and wherein the plurality of laser light sources comprise two or more blue laser light sources that are configured to emit light rays having respective ones of two or more third wavelengths corresponding to the blue colour.

5. The display device of claim 1, further comprising a colour filter array arranged on an optical path of the at least one light guide, wherein the colour filter array comprises colour filters of the at least two different colours.

6. The display device of claim 1, further comprising at least one quantum dot layer arranged on an optical path of the at least one light guide, wherein the at least one quantum dot layer comprises at least one quantum dot material configured to:
   absorb light rays of at least one of the at least two different colours; and
   re-emit the absorbed light rays at a relatively narrower band of wavelengths.

7. The display device of claim 1, wherein the at least one light guide is implemented as at least two light guides corresponding to respective ones of the at least two different colours, wherein the at least two light guides are stacked as layers.

8. A system comprising:
a display device of claim 1;
an optical combiner arranged on an optical path of the display device and on an optical path of a real-world light field of a real-world environment; and
at least one processor configured to:
  generate or retrieve an image to be displayed via the display device; and
  send the image to be displayed to the display device,
wherein the display device is employed to display the image for producing a synthetic light field, and wherein the optical combiner is employed to reflect the synthetic light field towards eyes of at least one user, whilst optically combining the real-world light field with the synthetic light field.

9. The system of claim 8, further comprising a tracker and a multiscopic optical element arranged on the optical path of the display device, wherein the at least one processor is configured to:
  determine a relative location of a first eye and of a second eye of the at least one user with respect to the optical combiner, by utilising the tracker, wherein the image is a light field image that is generated or retrieved based on the relative location of the first eye and of the second eye of the at least one user with respect to the optical combiner; and
  control the multiscopic optical element, based on the relative location of the first eye and of the second eye of the at least one user with respect to the optical combiner, to direct light rays corresponding to a first set of pixels and a second set of pixels of the light field image to produce a first part and a second part of the synthetic light field, respectively, for the first eye and the second eye of the at least one user.

10. The system of claim 8, further comprising an optical spreader arranged on the optical path of the display device, wherein the optical spreader is employed to spread individual ones of the light rays.

11. A method comprising:
  obtaining an image to be displayed via a display device, the display device comprising a plurality of laser light sources of at least two different colours and at least one light guide comprising a light inlet and a light outlet, the light outlet comprising a plurality of exit portions, the light inlet being arranged to receive light rays emitted by the plurality of laser light sources, wherein the at least one light guide is controllable to sequentially guide the light rays towards different exit portions of the light outlet; and
  displaying the image via the display device for producing a synthetic light field, wherein the step of displaying the image comprises displaying a given pixel of the image by:
    (i) determining a given exit portion of the light outlet corresponding to the given pixel, based on a pixel location of the given pixel in the image;
    (ii) controlling the plurality of laser light sources to emit light rays having a colour and an intensity representative of the given pixel, based on intensity values of different colour components of the given pixel in the image; and
    (iii) controlling the at least one light guide to guide said light rays towards the given exit portion from which the light rays exit.

12. The method of claim 11, wherein the at least two different colours include a red colour, and wherein the plurality of laser light sources comprise two or more red laser light sources that are configured to emit light rays having respective ones of two or more first wavelengths corresponding to the red colour.

13. The method of claim 11, wherein the at least two different colours include a green colour, and wherein the plurality of laser light sources comprise two or more green laser light sources that are configured to emit light rays having respective ones of two or more second wavelengths corresponding to the green colour.

14. The method of claim 11, wherein the at least two different colours include a blue colour, and wherein the plurality of laser light sources comprise two or more blue laser light sources that are configured to emit light rays having respective ones of two or more third wavelengths corresponding to the blue colour.

15. The method of claim 11, wherein the display device further comprises a colour filter array arranged on an optical path of the at least one light guide, wherein the colour filter array comprises colour filters of the at least two different colours.

16. The method of claim 11, wherein the display device further comprises at least one quantum dot layer arranged on an optical path of the at least one light guide, wherein the at least one quantum dot layer comprises at least one quantum dot material configured to absorb light rays of at least one of the at least two different colours, and re-emit the absorbed light rays at a relatively narrower band of wavelengths.

17. The method of claim 11, wherein the at least one light guide is implemented as at least two light guides corresponding to respective ones of the at least two different colours, wherein the at least two light guides are stacked as layers.

18. The method of claim 11, further comprising employing an optical combiner, arranged on an optical path of the display device and on an optical path of a real-world light field of a real-world environment, to reflect the synthetic light field towards eyes of at least one user, whilst optically combining the real-world light field with the synthetic light field.

19. The method of claim 18, further comprising:
  determining a relative location of a first eye and of a second eye of the at least one user with respect to the optical combiner, wherein the image is a light field image that is generated or retrieved based on the relative location of the first eye and of the second eye of the at least one user with respect to the optical combiner; and
  controlling a multiscopic optical element arranged on the optical path of the display device, based on the relative location of the first eye and of the second eye of the at least one user with respect to the optical combiner, to direct light rays corresponding to a first set of pixels and a second set of pixels of the light field image to produce a first part and a second part of the synthetic light field, respectively, for the first eye and the second eye of the at least one user.

20. The method of claim 11, further comprising employing an optical spreader, arranged on an optical path of the display device, to spread individual ones of the light rays.

* * * * *